United States Patent
Kurota et al.

(10) Patent No.: US 11,800,073 B2
(45) Date of Patent: Oct. 24, 2023

(54) SETTING SUPPORT METHOD, SETTING SUPPORT SYSTEM FOR PROJECTION REGION, AND NON-TRANSITORY COMPUTER-READABLE STORAGE MEDIUM STORING A PROGRAM

(71) Applicant: SEIKO EPSON CORPORATION, Tokyo (JP)

(72) Inventors: Ippei Kurota, Matsumoto (JP); Kota Takeuchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/507,175

(22) Filed: Oct. 21, 2021

(65) Prior Publication Data
US 2022/0132087 A1    Apr. 28, 2022

(30) Foreign Application Priority Data
Oct. 22, 2020  (JP) .................. 2020-177609

(51) Int. Cl.
*H04N 9/31*   (2006.01)
*G06T 7/13*   (2017.01)
*G06T 7/50*   (2017.01)
*G06F 18/22*  (2023.01)

(52) U.S. Cl.
CPC .......... *H04N 9/3185* (2013.01); *G06F 18/22* (2023.01); *G06T 7/13* (2017.01); *G06T 7/50* (2017.01)

(58) Field of Classification Search
CPC .......... H04N 9/3185; G06T 7/50; G06T 7/13; G06K 9/6215; G06F 18/22
See application file for complete search history.

(56) References Cited

U.S. PATENT DOCUMENTS

| | | | |
|---|---|---|---|
| 9,014,433 B2* | 4/2015 | Kobayashi | G06T 7/70 348/46 |
| 9,111,177 B2* | 8/2015 | Tateno | G01B 11/03 |
| 9,405,182 B2* | 8/2016 | Moteki | G03B 17/54 |
| 9,565,409 B2* | 2/2017 | Poisner | H04N 9/3185 |

(Continued)

FOREIGN PATENT DOCUMENTS

| | | |
|---|---|---|
| JP | 2006-189712 A | 7/2006 |
| JP | 2008-092011 A | 4/2008 |

(Continued)

*Primary Examiner* — Brian P Yenke
(74) *Attorney, Agent, or Firm* — Oliff PLC

(57) ABSTRACT

There is provided a setting support method for a projection region including, acquiring a first image obtained by imaging a projection object onto which a projection image is projected, estimating a shape of a projection region, which is a projection destination of the projection image in the projection object, calculating a first similarity degree indicating a degree of similarity of a first template image showing a first candidate of the shape of the projection region and the shape estimated based on the first image, calculating a second similarity degree indicating a degree of similarity of a second template image showing a shape of a second candidate different from the first candidate and the shape estimated based on the first image, and displaying the first template image and the second template image in display order or display forms corresponding to the first similarity degree and the second similarity degree.

15 Claims, 6 Drawing Sheets

(56) References Cited

U.S. PATENT DOCUMENTS

| | | | | |
|---|---|---|---|---|
| 9,998,719 | B2* | 6/2018 | Wang | H04N 9/3188 |
| 10,006,762 | B2* | 6/2018 | Furihata | G01B 11/254 |
| 10,332,275 | B2* | 6/2019 | Niwayama | G06T 7/75 |
| 10,345,687 | B2* | 7/2019 | Sugaya | G06F 3/0484 |
| 10,527,409 | B2* | 1/2020 | Yamauchi | G01B 11/25 |
| 10,528,853 | B1* | 1/2020 | Yao | G03B 17/54 |
| 11,144,786 | B2* | 10/2021 | Tomioka | G06K 9/6256 |
| 11,336,878 | B2* | 5/2022 | Yoon | H04N 9/3185 |
| 11,356,646 | B1* | 6/2022 | Park | H04N 9/3194 |
| 11,379,946 | B2* | 7/2022 | Yamauchi | G06T 7/521 |
| 11,412,194 | B2* | 8/2022 | Comradd | G06F 16/54 |
| 11,616,934 | B2* | 3/2023 | Pyo | H04N 25/13 348/297 |
| 2005/0234323 | A1* | 10/2005 | Kayahara | G06T 7/00 600/407 |
| 2005/0237410 | A1* | 10/2005 | Shiohara | H04N 5/232939 348/333.01 |
| 2008/0079854 | A1 | 4/2008 | Ehara et al. | |
| 2009/0115916 | A1* | 5/2009 | Kondo | H04N 9/3185 348/E3.043 |
| 2010/0328682 | A1* | 12/2010 | Kotake | G01B 11/25 356/620 |
| 2013/0076865 | A1* | 3/2013 | Tateno | G01B 11/25 348/46 |
| 2013/0127998 | A1* | 5/2013 | Kobayashi | G01B 11/00 348/46 |
| 2014/0204120 | A1* | 7/2014 | Moteki | G06T 19/006 345/633 |
| 2015/0077584 | A1* | 3/2015 | Kunieda | H04N 9/3194 348/222.1 |
| 2016/0182903 | A1* | 6/2016 | Grundhöfer | H04N 17/002 348/187 |
| 2016/0196659 | A1* | 7/2016 | Vrcelj | G06T 7/11 382/154 |
| 2016/0292889 | A1* | 10/2016 | Niwayama | G06T 7/75 |
| 2017/0032530 | A1* | 2/2017 | Furihata | G06T 7/521 |
| 2017/0124704 | A1* | 5/2017 | Wu | G06T 7/0012 |
| 2017/0142381 | A1* | 5/2017 | Kaji | G06F 18/22 |
| 2018/0176520 | A1* | 6/2018 | Jang | H04N 9/3194 |
| 2019/0130216 | A1* | 5/2019 | Tomioka | G06K 9/6256 |
| 2019/0364253 | A1 | 11/2019 | Miyatani et al. | |
| 2020/0059631 | A1* | 2/2020 | Kondo | G06F 3/165 |
| 2021/0306605 | A1* | 9/2021 | Ichieda | H04N 9/3188 |
| 2021/0350501 | A1* | 11/2021 | Yamauchi | G06T 7/73 |
| 2022/0030207 | A1* | 1/2022 | Makita | H04N 9/3176 |
| 2022/0076372 | A1* | 3/2022 | Kurota | G06T 7/73 |
| 2022/0078383 | A1* | 3/2022 | Kurota | G03B 21/147 |
| 2022/0078384 | A1* | 3/2022 | Kurota | H04N 9/3176 |
| 2022/0078385 | A1* | 3/2022 | Yeung | H04N 9/3194 |
| 2022/0132088 | A1* | 4/2022 | Kurota | H04N 9/3194 |
| 2022/0191443 | A1* | 6/2022 | Kurota | G03B 21/147 |
| 2022/0264062 | A1* | 8/2022 | Nishimoto | G06T 7/50 |

FOREIGN PATENT DOCUMENTS

| | | | | |
|---|---|---|---|---|
| JP | 4560832 | B2 * | 10/2010 | G06K 9/00288 |
| JP | 2016191896 | A * | 11/2016 | |
| JP | 2019-205134 | A | 11/2019 | |

* cited by examiner

SETTING SUPPORT METHOD, SETTING SUPPORT SYSTEM FOR PROJECTION REGION, AND NON-TRANSITORY COMPUTER-READABLE STORAGE MEDIUM STORING A PROGRAM

The present application is based on, and claims priority from JP Application Serial Number 2020-177609, filed Oct. 22, 2020, the disclosure of which is hereby incorporated by reference herein in its entirety.

BACKGROUND

1. Technical Field

The present disclosure relates to a setting support method and a setting support system for a projection region and a program.

2. Related Art

When a plane screen, onto which a projection image is projected from a projector, is not right opposed to the projector, the projection image is seen distorted for a user. There have been proposed various techniques for correcting the distortion of the projection image when the projector is not right opposed to the plane screen. Examples of the correction techniques include a technique disclosed in JP-A-2008-92011 (Patent Literature 1). Patent Literature 1 discloses a technique for correcting the distortion using a calibration image. The calibration image includes one pattern image showing a rectangle and includes, in upper, lower, left, right, and oblique positions, eight pattern images showing trapezoids having widths decreasing toward the center of the pattern images. The technique disclosed in Patent Literature 1 causes a user to select a pattern image seen rectangular, that is, a pattern image, distortion of which is seen corrected, out of the pattern images included in the calibration image actually projected onto a plane screen. In the technique disclosed in Patent Literature 1, correction of distortion of a projection image is realized by correcting the projection image according to the pattern image selected by the user.

When a projection object having a three-dimensional shape is a projection destination of the projection image as in projection mapping, distortion of an image viewed by the user sometimes cannot be corrected by the pattern images that consider only trapezoidal correction as in the technique disclosed in Patent Literature 1. About the projection object having the three-dimensional shape, there could be a large number of shapes that can be set as a shape of a projection region in which the projection image is projected. Accordingly, even if a variety of pattern images are prepared in advance considering the three-dimensional shape of the projection object, it is sometimes difficult for the user to find out an appropriate pattern image out of the pattern images.

SUMMARY

A setting support method for a projection region according to an aspect of the present disclosure includes: acquiring a first image obtained by imaging, with an imaging device, a projection object onto which a projection image is projected from a projector; estimating, based on the first image, a shape of a projection region, which is a projection destination of the projection image in the projection object; calculating, about a first template image showing a first candidate of a shape of the projection region and a second template image showing a shape of a second candidate different from the first candidate, similarity degrees to the shape estimated based on the first image; and displaying the first template image and the second template image in display order or display forms corresponding to the similarity degrees to urge a user to set one of the first candidate and the second candidate as the shape of the projection region.

A setting support system according to an aspect of the present disclosure includes: an imaging device; a display device; and a processing device. The processing device executes: acquiring a first image obtained by imaging, with the imaging device, a projection object onto which a projection image is projected from a projector; estimating, based on the first image, a shape of a projection region, which is a projection destination of the projection image in the projection object; calculating a first similarity degree indicating a degree of similarity of a first template image showing a first candidate of the shape of the projection region and the shape estimated based on the first image; calculating a second similarity degree indicating a degree of similarity of a second template image showing a shape of a second candidate different from the first candidate and the shape estimated based on the first image; and displaying the first template image and the second template image in display order or display forms corresponding to the first similarity degree and the second similarity degree to urge a user to set one of the first candidate and the second candidate as the shape of the projection region.

A non-transitory computer-readable storage medium according to an aspect of the present disclosure stores a program, the program causing a computer to execute: acquiring a first image obtained by imaging, with an imaging device, a projection object onto which a projection image is projected from a projector; estimating, based on the first image, a shape of a projection region, which is a projection destination of the projection image in the projection object; calculating a first similarity degree indicating a degree of similarity of a first template image showing a first candidate of the shape of the projection region and the shape estimated based on the first image; calculating a second similarity degree indicating a degree of similarity of a second template image showing a shape of a second candidate different from the first candidate and the shape estimated based on the first image; and displaying the first template image and the second template image in display order or display forms corresponding to the first similarity degree and the second similarity degree to urge a user to set one of the first candidate and the second candidate as the shape of the projection region.

DESCRIPTION OF EXEMPLARY EMBODIMENTS

An embodiment of the present disclosure is explained below with reference to the drawings. Technically preferred various limitations are added to the embodiment explained below. However, embodiments of the present disclosure are not limited to the embodiment explained below.

1. Embodiment

Figure 1:
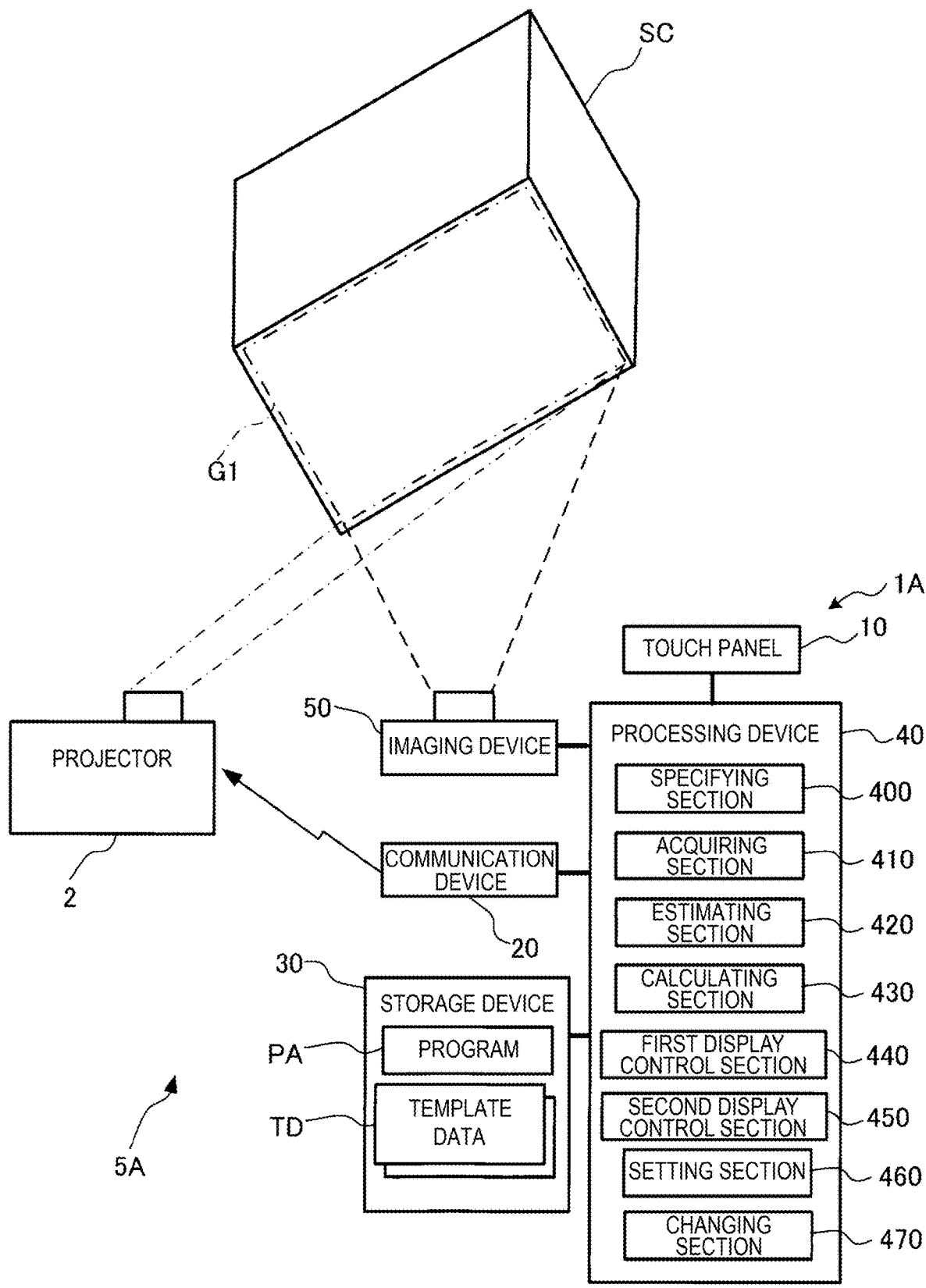
FIG. 1 is a block diagram showing a configuration example of an image display system including a setting support device that executes a setting support method according to an embodiment of the present disclosure.

FIG. 1 is a block diagram showing a configuration example of an image display system 5A including a setting support device 1A that executes a setting support method for a projection region according to an embodiment of the present disclosure. The image display system 5A includes, besides the setting support device 1A, a projector 2 that communicates with the setting support device 1A. The projector 2 projects a projection image G1 corresponding to image data supplied from the setting support device 1A onto the surface of a projection object SC. In FIG. 1, although detailed illustration is omitted, the projector 2 includes a light source, three display panels functioning as a light modulating device, a projection lens, and a display-panel deriving section.

The three display panels in the projector 2 respectively correspond to colors of red, green, and blue. In this embodiment, the display panels are liquid crystal light valves. The display-panel driving section controls light transmittance in each of the three display panels according to the image data supplied from the setting support device 1A. The projector 2 modulates light emitted from the light source in each of the three display panels to form image light and projects the image light from the projection lens to display the projection image G1 on the surface of the projection object SC. The projection object SC in this embodiment is a rectangular parallelepiped as shown in FIG. 1 but may have a three-dimensional shape formed by joining polygons such as a trigonal pyramid or a square pyramid or a three-dimensional shape having a curved surface.

The setting support device 1A is, for example, a smartphone. The setting support device 1A has an imaging function and a communication function for communicating with the projector 2. When the setting support device 1A and the projector 2 are network-connected, the setting support device LA communicates with the projector 2 and acquires projector information from the projector 2. The projector information includes internal parameters of the projector 2, resolution information, and compression scheme information indicating a compression scheme capable of performing decoding in the projector 2.

The internal parameters of the projector are parameters indicating projection characteristics of each individual projector. Specific examples of the internal parameters include data indicating a focal length of the projection lens, a degree of deviation of an image center, and a degree of lens distortion. The resolution information is information indicating the resolution of the display panels in the projector 2. The resolution information is used when a measurement pattern for measuring a position of a projection image projected onto the projection object SC by the projector is generated. As explained in detail below, in this embodiment, a binary code pattern is used as the measurement pattern. The compression scheme information is used for, when measurement pattern data indicating the measurement pattern is compressed and transmitted from the setting support device 1A to the projector 2, determination of a compression scheme of the measurement pattern data. The compression scheme in compressing the measurement pattern data and transmitting the measurement pattern data from the setting support device 1A to the projector 2 is desirably reversible compression schemes such as run length, LZH, PNG, and GIF.

The setting support device 1A generates, using the resolution information acquired from the projector 2, measurement pattern data representing each of a plurality of measurement patterns and gives the generated measurement pattern data to the projector 2. The projector 2 projects, onto the projection object SC, images of the plurality of measurement patterns indicated by the measurement pattern data given from the setting support device 1A. The setting support device 1A may transmit a command to the projector 2. The projector 2 may generate the measurement pattern data based on the command. When the command is transmitted from the setting support device 1A to the projector 2, it is unnecessary to include the compression scheme information in the projector information. In an aspect in which the projector 2 generates the measurement pattern data, a communication time for transmitting the measurement patterns from the setting support device 1A to the projector 2 is reduced.

The setting support device 1A urges the user to image, for each of the measurement patterns, the projection object SC onto which an image of the measurement pattern is projected by the projector 2. The setting support device 1A images, according to operation by the user, with the imaging function, the projection object SC onto which the image of the measurement pattern is projected. The setting support device 1A specifies a correspondence relation between a projector coordinate system and a camera coordinate system from a plurality of captured images and images of the plurality of measurement patterns. The projector coordinate system is a coordinate system indicating a position on a projection image projected by the projector 2. Examples of the projector coordinate system include a two-dimensional coordinate system having a left upper corner of the projection image as the origin. The camera coordinate system is a coordinate system indicating a position on a captured image. Specific examples of the camera coordinate system include a two-dimensional coordinate system having the upper left corner of the captured image as the origin. Specifying the correspondence relation between the projector coordinate system and the camera coordinate system means generating a transformation matrix for projective transformation from one coordinate system to the other coordinate system. As explained in detail below, the transformation matrix is used when estimating, from a captured image of the projection object SC, a shape of a projection region, which is a projection destination of a projection image in the projection object SC.

As shown in FIG. 1, the setting support device 1A includes a touch panel 10, a communication device 20, a storage device 30, a processing device 40, and an imaging device 50. The communication device 20 is a wireless communication module or a wired communication module. When the communication device 20 is the wired communication module, the communication device 20 is connected to the projector 2 via a communication line. Connection of the setting support device 1A and the projector 2 may be direct connection not via a relay device such as a router or may be indirect connection via the relay device. When the communication device 20 is the wireless communication module, specific examples of the direct connection include ad-hoc connection and specific examples of the indirect connection include access point connection via a wireless access point device. When the communication device 20 is the wired communication module, specific examples of the direct connection include peer-to-peer connection and specific examples of the indirect connection include connection via a wired router or a wired hub. The communication device 20 communicates with the projector 2 under control by the processing device 40. The imaging device 50 is a camera. The imaging device 50 performs imaging under the control by the processing device 40 and supplies image data representing a captured image to the processing device 40.

The touch panel 10 is a device obtained by integrating a display device that displays an image and an input device to which information is input by the user. The input device is, for example, a transparent sheet-like contact sensor. The input device is provided to cover a display surface of the display device. The input device detects a touch position using capacitance specified by an object in contact with the input device and the input device and outputs data indicating the detected touch position to the processing device 40. Consequently, operation content of the user on the touch panel 10 is transmitted to the processing device 40.

The storage device 30 is a recording medium readable by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 30, a program PA to be executed by the processing device 40 is stored. The volatile memory of the storage device 30 is used by the processing device 40 as a work area in executing the program PA. The program PA can be called "application program", "application software", or "application" as well. The program PA is acquired from, for example, a not-shown server via the communication device 20. Thereafter, the program PA is stored in the storage device 30. The program PA may be stored in the storage device 30 in advance.

In the storage device 30, internal parameters of the imaging device 50 and a plurality of template data TD are stored in advance. The internal parameters of the imaging device 50 are parameters indicating imaging characteristics of each individual imaging device. Specific examples of the internal parameters of the imaging device 50 include data indicating a focal length of an imaging lens, a degree of deviation of an image center, and a degree of lens distortion. The template data TD is data representing a candidate image of a shape of a projection region set in the projection object SC. In the following explanation, the candidate image of the shape of the projection region is referred to as a template image. Template images represented by the respective plurality of template data TD stored in the storage device 30 represent shapes different from one another.

Figure 2:
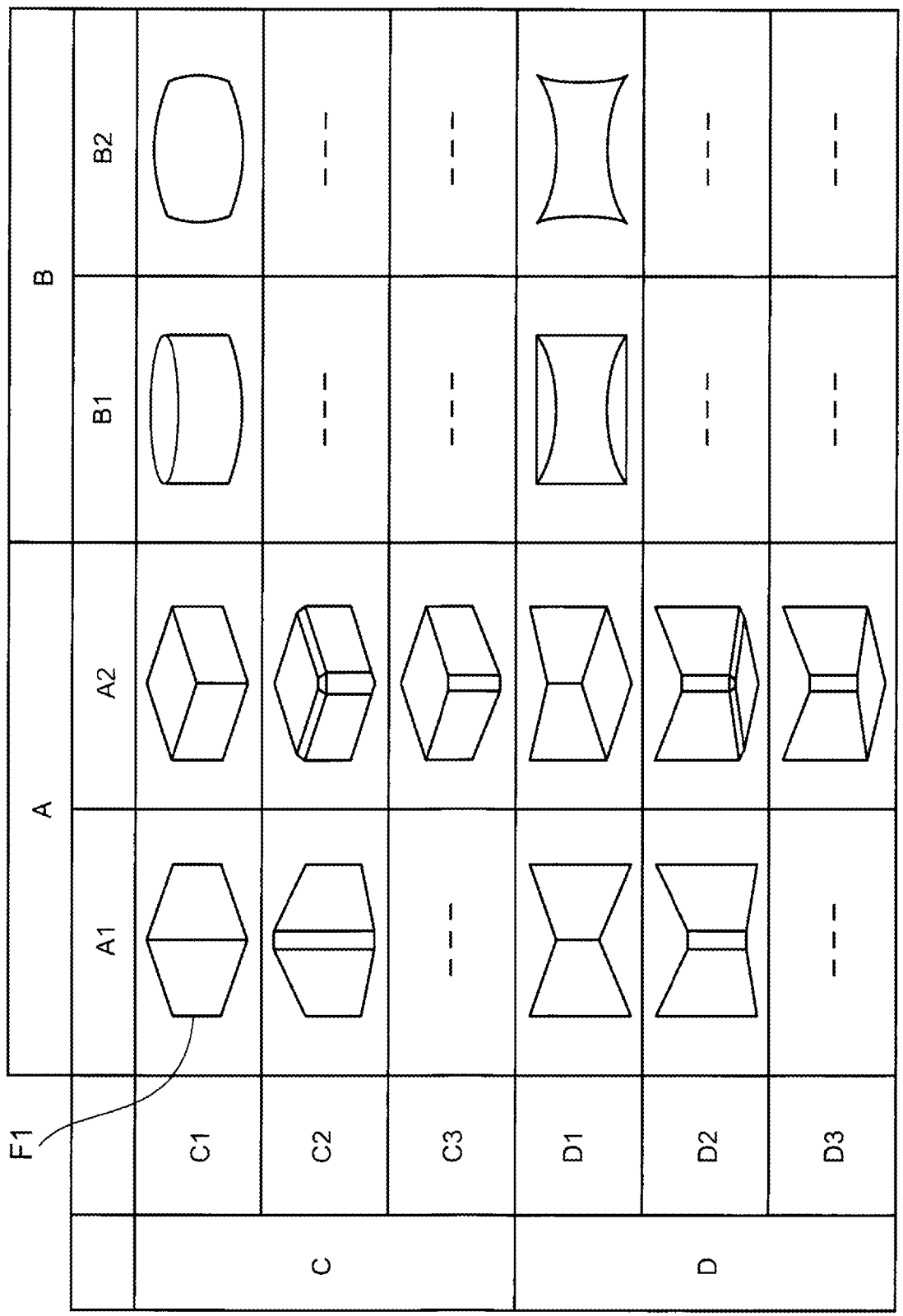
FIG. 2 is a diagram showing an example of shapes represented by template images in the embodiment.

FIG. 2 is a diagram showing an example of shapes represented by the template images. In FIG. 2, as an example of shapes represented by a respective plurality of template images, fourteen types of shapes are shown. In this embodiment, the shapes represented by the template images are roughly divided into shapes in an A column and shapes in a B column as shown in FIG. 2 according to types of surfaces forming the shapes.

The shapes in the A column are shapes formed by only planes. The shapes in the A column are classified into shapes in an A1 column and shapes in an A2 column according to the numbers of planes forming main surfaces forming the shapes. The shapes in the A1 column are shapes, main surfaces of which are formed by two planes. The shapes in the A2 column are shapes, main surfaces of which are formed by three planes. The shapes in the B column are shapes including curved surfaces. The shapes in the B column are classified into shapes in a B1 column and shapes in a B2 column. The shapes in the B1 column are shapes formed by curved surfaces and planes. The shapes in the B2 column are shapes formed by only curved surfaces like, for example, a sphere.

The fourteen types of shapes shown in FIG. 2 are roughly divided into shapes in a C row and shapes in a D row according to spreads in a viewing direction from an observer. The shapes in the C row are shapes spreading to project toward the observer. As shown in FIG. 2, the shapes in the C row are further classified into shapes in a C1 row, a C2 row, and a C3 row according to connections of surfaces forming the shapes. The shapes in the C2 row are shapes, corner portions forming two surfaces of which are chamfered. The shapes in the C1 row are shapes, corner portions of which are not chamfered. The shapes in the C3 row are shapes in which chambered corner portions and corner portions not chamfered are mixed.

The shapes in the D row are shapes spreading to hollow when viewed from the observer. As shown in FIG. 2, the shapes in the D row are further classified into shapes in a D1 row, a D2 row, and a D3 row according to connections of surfaces forming the shapes. The shapes in the D2 row are shapes, corner portions of which are chamfered. The shapes in the D1 row are shapes, corner portions of which are not chamfered. The shapes in the D3 row are shapes in which chamfered corner portions and corner portions not chamfered are mixed. In the following explanation, when the respective fourteen shapes shown in FIG. 2 are referred to, the shapes are designated by column numbers and row numbers in FIG. 2. For example, a shape F1 shown in FIG. 2 is referred to as a shape in the A1 column and the C1 row. A sign "---" in each of the A1 column and the C3 row, the A1 column and the D3 row, the B1 column and the C2 row, the B1 column and the C3 row, the B1 column and the D2 row, the B1 column and the D3 row, the B2 column and the C2 row, the B2 column and the C3 row, the B2 column and the D2 row, and the B2 column and the D3 row in FIG. 2 means that there is no corresponding shape.

In the storage device 30, fourteen template data TD corresponding to the respective fourteen types of shapes shown in FIG. 2 in a one-to-one relation may be stored or any two to thirteen template data TD among the fourteen template data TD may be stored. Fourteen or more template data TD respectively corresponding to different shapes may be stored in the storage device 30. In the following explanation, eight template data TD corresponding to respective shapes in the A1 column and the C1 row, the A1 column and the D1 row, the A1 column and the C2 row, the A2 column and the C1 row, the A2 column and the C3 row, the A2 column and the D1 row, the B1 column and the C1 row, and the B2 column and the C1 row in FIG. 2 in a one-to-one relation are stored in the storage device 30.

The processing device 40 includes a processor such as a CPU (Central Processing Unit), that is, a computer. The processing device 40 may be configured by a single computer or may be configured by a plurality of computers. According to operation for instructing an execution start of the program PA performed on the touch panel 10, the processing device 40 reads out the program PA from the nonvolatile memory to the volatile memory and starts execution of the program PA. The processing device 40 operating according to the program PA functions as a specifying section 400, an acquiring section 410, an estimating section 420, a calculating section 430, a first display control section 440, a second display control section 450, a setting section 460, and a changing section 470 shown in FIG. 1. The specifying section 400, the acquiring section 410, the estimating section 420, the calculating section 430, the first display control section 440, the second display control section 450, the setting section 460, and the changing section 470 shown in FIG. 1 are software modules realized by causing the processing device 40 to operate according to the program PA.

The specifying section 400 specifies a correspondence relation between the projector coordinate system and the camera coordinate system based on an image of a measurement pattern projected from the projector 2 and a captured image of the projection object SC onto which the image of the measurement pattern is projected. More specifically, the specifying section 400 acquires projector information when being instructed to start specifying the correspondence relation by operation on the touch panel 10 under a situation in which the setting support device 1A and the projector 2 are network-connected. Subsequently, the specifying section 400 generates measurement pattern data from resolution information included in the projector information. The specifying section 400 controls the projector 2 to sequentially project a respective plurality of measurement patterns represented by the measurement pattern data. The specifying section 400 urges the user to image the respective plurality of measurement patterns sequentially projected onto the projection object SC and causes the imaging device 50 to perform imaging according to operation by the user. The specifying section 400 specifies a correspondence relation between the projector coordinate system and the camera coordinate system from images of the plurality of measurement patterns and a plurality of captured images captured by the imaging device 50.

More specifically, the specifying section 400 generates, from the images of the plurality of measurement patterns and the plurality of capture images, a transformation matrix for performing projective transformation of a coordinate of a measurement pattern in a captured image captured by the imaging device 50 into a coordinate of a measurement pattern in the display device of the projector 2. The transformation matrix is used in deformation for realizing geometrical correction of a projection image projected onto the projection object SC. In this embodiment, when the projection image is projected from the projector 2, image data of the projection image including a projection object for which geometrical correction is already carried out using the transformation matrix is given from the setting support device 1A to the projector 2. The projector 2 projects an image according to the image data.

As explained above, in this embodiment, the binary code pattern is used as the measurement pattern. The binary code pattern means an image for representing a coordinate of the display device using a binary code. The binary code is a method of representing, with ON and OFF of a switch, values of digits when any numerical value is represented by a binary number. When the binary code pattern is used as the measurement pattern, an image projected by the projector 2 corresponds to the switch. Images equivalent to the number of digits of a binary number representing a coordinate value are necessary. Separate images are necessary respectively in an X coordinate and a Y coordinate. For example, when the resolution of the display panel of the projector 2 is 120×90, since 120 and 90 are respectively represented by binary numbers of seven digits, seven images are necessary to represent the X coordinate and seven images are necessary to represent the Y coordinate.

Figure 3:
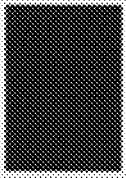
FIG. 3 is a diagram showing an example of a measurement pattern in the embodiment.

When the binary code pattern is used as the measurement pattern, it is generally known that robustness of measurement is deteriorated by the influence of disturbance light such as illumination. Accordingly, when the binary code pattern is used as the measurement pattern, in general, a complementary pattern is concurrently used in order to suppress the influence of the disturbance light and improve the robustness of the measurement. The complementary pattern means an image in which white and black are inverted. In the following explanation, a binary code pattern representing 1 with white and representing 0 with black is referred to as "positive pattern" and a complementary pattern obtained by inverting the positive pattern is referred to as "negative pattern". In this embodiment, when resolution indicated by resolution information is 120×90, as shown in FIG. 3, measurement pattern data representing twenty-eight measurement patterns in total including fourteen positive patterns and fourteen negative patterns is generated by the specifying section 400. In this embodiment, the binary code pattern is used as the measurement pattern. However, other structured light such as a dot pattern, a rectangular pattern, a polygonal pattern, a checker pattern, a gray code pattern, a phase shift pattern, or a random dot pattern may be used.

The acquiring section 410 acquires a captured image of the projection object SC captured by the imaging device 50. The captured image acquired by the acquiring section 410 is an example of the first image in the present disclosure. The processing device 40 may cause the acquiring section 410 to acquire, as the first image, an image obtained by imaging, with the imaging device 50, the projection object SC in a state in which any one of the plurality of measurement patterns is projected. The processing device 40 may cause the acquiring section 410 to acquire an image obtained by imaging, with the imaging device 50, the projection object SC separately from the plurality of captured images used to specify the correspondence relation.

The estimating section 420 estimates, based on the captured image of the projection object SC captured by the imaging device 50, a shape of a projection region, which is a projection destination of a projection image in the projection object SC. More specifically, the estimating section 420 performs three-dimensional measurement about the projection object SC based on the correspondence relation specified by the specifying section 400, the internal parameters of the imaging device 50 and the internal parameters of the projector 2, and the captured image acquired by the acquiring section 410. A well-known technique only has to be used as appropriate for the three-dimensional measurement. Subsequently, the estimating section 420 performs three-dimensional Hough transform on the three-dimensional measurement result about the projection object SC and calculates the number of surfaces of the projection object SC reflected in the captured image, a type of the surfaces, and a type of corner portions to estimate the shape of the projection region.

The calculating section 430 calculates, about the respective plurality of template images represented by the template data TD stored in the storage device 30, similarity degrees to the shape estimated by the estimating section 420. More specifically, the calculating section 430 calculates, about shapes represented by the respective plurality of template data TD, the numbers of surfaces, types of the surfaces, and types of corner portions. The calculating section 430 adds, about the numbers of surfaces, the types of the surfaces, and the types of the corner portions, larger weights to shapes more approximate to the shape estimated by the estimating section 420. A total value of the weights plays a role of a similarity degree representing a degree of similarity to the shape estimated by the estimating section 420. For example, it is assumed that first template data TD representing a first template image and second template data TD representing a second template image are stored in the storage device 30. The first template image is an image representing a first candidate of a shape of the projection region. The second template image is an image representing a shape of a second candidate different from the first candidate. In this case, first, the calculating section 430 calculates, about the shape of the first candidate, a first similarity degree representing a degree of similarity to the shape estimated by the estimating section 420. Subsequently, the calculating section 430 calculates, about the shape of the second candidate, a second similarity degree representing a degree of similarity to the shape estimated by the estimating section 420. If the first similarity degree is larger than the second similarity degree, this means that the shape of the first candidate is more similar to the shape of the projection region than the shape of the second candidate.

Figure 4:
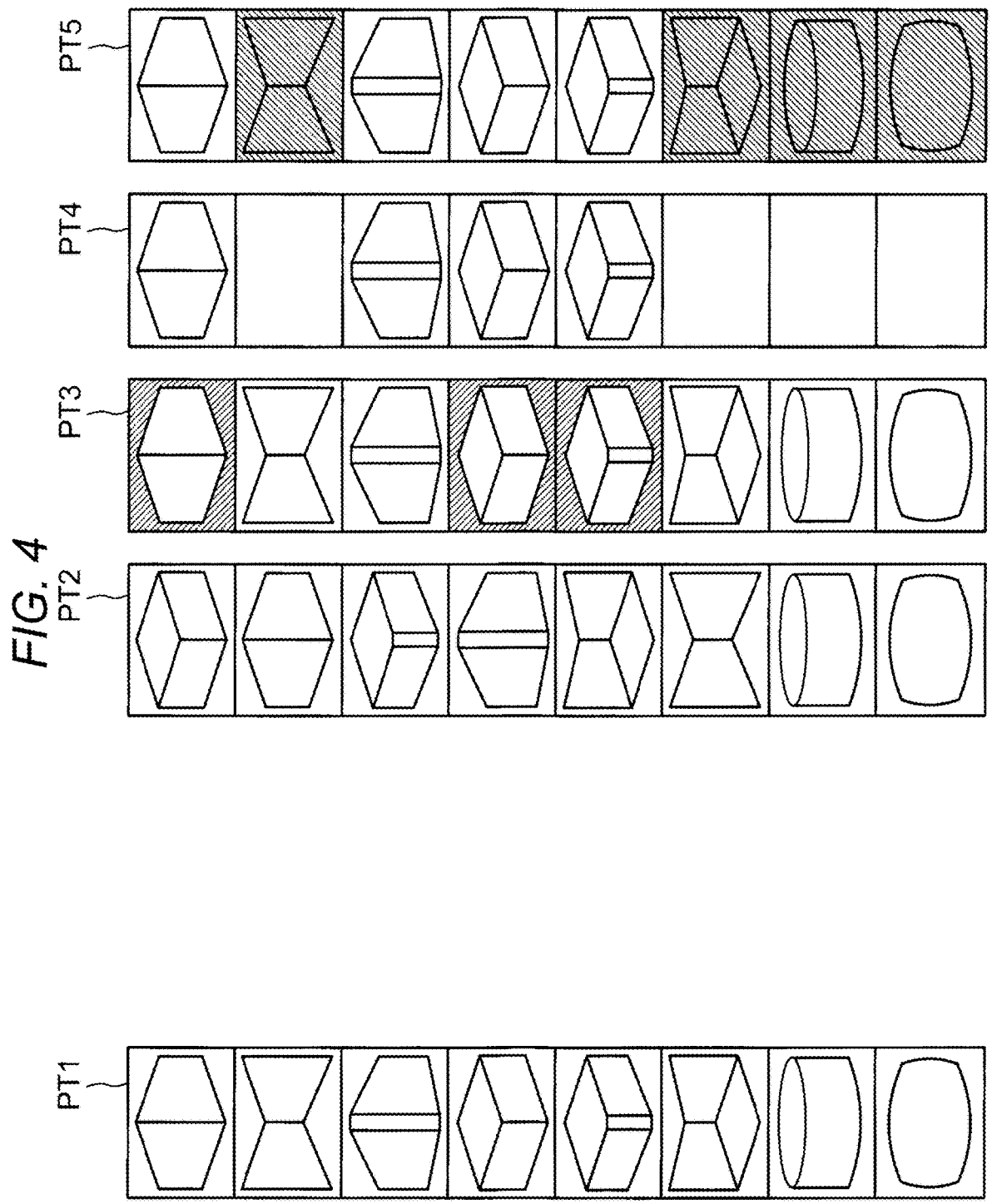
FIG. 4 is a diagram showing a display example of a pattern image in the embodiment.

Both of the first display control section 440 and the second display control section 450 cause the display device of the touch panel 10 to display the shapes represented by the respective plurality of template data TD to urge the user to set anyone of the shapes as the shape of the projection region. More specifically, the second display control section 450 arrays the shapes represented by the respective plurality of template data TD in predetermined display order and causes the display device to display the shapes. In this embodiment, a display pattern PT1 shown in FIG. 4 is decided in advance as initial display order of the shapes represented by the respective plurality of template data TD. Accordingly, the second display control section 450 causes the display device to display a list image in which the shapes represented by the respective plurality of template data TD are arrayed in the display pattern PT1 shown in FIG. 4. The initial display order of the shapes represented by the respective plurality of template data TD is not limited to the display pattern PT1 shown in FIG. 4. The initial display order of the shapes represented by the plurality of template data TD may be order of the A1 column, the A2 column, the B1 column, and the B2 column or may be order of the C1 row, the C2 row, the C3 row, the D1 row, the D2 row, and the D3 row.

The first display control section 440 is the same as the second display control section 450 in that the first display control section 440 causes the display device of the touch panel 10 to display a list image in which the shapes represented by the respective plurality of template data TD are arrayed in a row from the top to the bottom. However, the first display control section 440 is different from the second display control section 450 in that the first display control section 440 causes the display device to display the shapes represented by the respective plurality of template data TD in display order corresponding to similarity degrees of the respective shapes or display forms corresponding to the similarity degrees of the respective shapes. Display examples by the first display control section 440 of the shapes represented by the respective plurality of template data TD include display patterns PT2, PT3, PT4, and PT5 shown in FIG. 4. In the following explanation, specific contents of the respective display patterns PT2, PT3, PT4, and PT5 are explained with reference to an example in which a captured image G2 shown in FIG. 5 is acquired by the acquiring section 410.

The display pattern PT2 is a form in which the shapes represented by the respective plurality of template data TD are arrayed and displayed in display order corresponding to similarity degrees to the shape of the projection region estimated by the estimating section 420, specifically, descending order of the similarity degrees. In this embodiment, the display pattern PT2 is adopted as a display form by the first display control section 440. For example, it is assumed that the first similarity degree is larger than the second similarity degree. In this case, according to the display pattern PT2, a list image in which a shape represented by the first template image and a shape represented by the second template image are arrayed in this order from the top to the bottom is displayed on the display device. The shapes represented by the respective plurality of template data TD are arrayed in the descending order of the similarity degrees to the shape of the projection region estimated by the estimating section 420 in order to display a shape having the highest similarity degree in a most conspicuous position for the eyes of the user. This is because, when the list image is displayed, a line of sight of the user is normally directed to the uppermost part of the list image.

Figure 5:
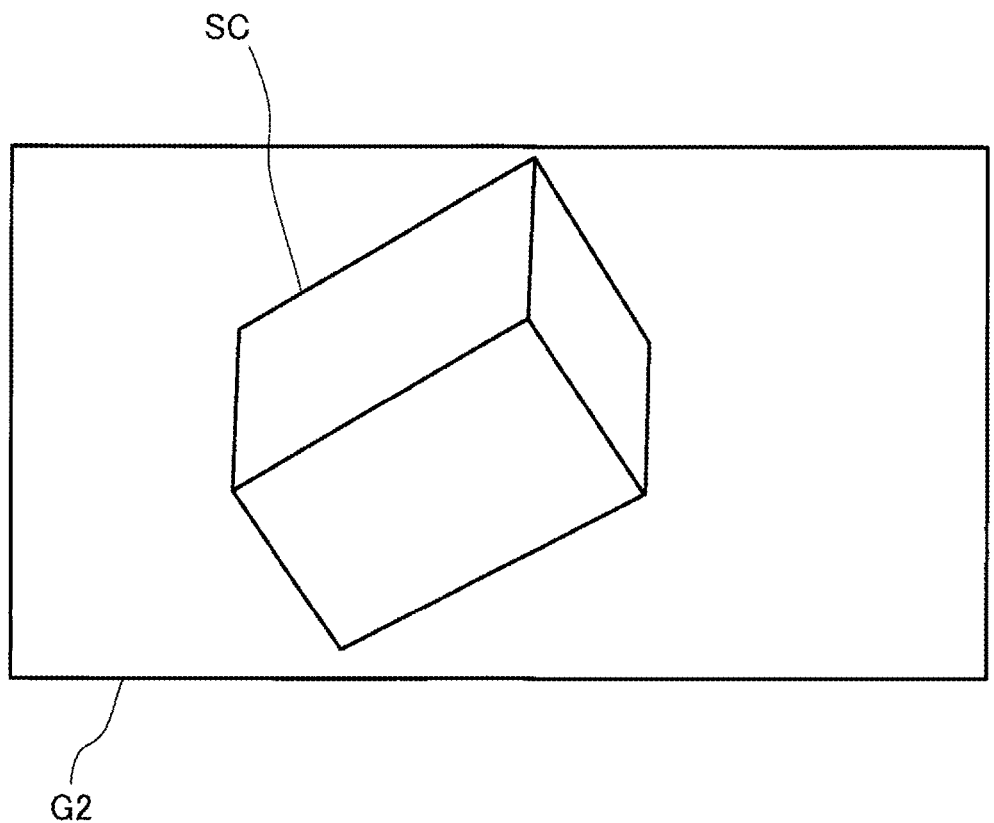
FIG. 5 is a diagram showing an example of a captured image of a projection object.

Three surfaces of the projection object SC, which is the rectangular parallelepiped, are reflected in the captured image G2 shown in FIG. 5. All of the three surfaces are planes. The projection object SC is the rectangular parallelepiped, that is, has a shape spreading to project when viewed from an observer. Therefore, the weight is larger in the shapes in the C row than the shapes in the D row. Since corner portions are not chamfered in the projection object SC, the weight of the shapes in the C1 row is the largest among the shapes in the C row. The weight is larger in the shapes in the A column than the shapes in the B column. Since the three surfaces of the projection object SC are reflected in the captured image G2, the weight is larger in the A2 column than the A1 column in the A column. When these weights are totaled, similarity degrees are smaller in the order of the shape in the A2 column and the C1 row, the shape in the A1 column and the C1 row, the shape in the A2 column and the C3 row, the shape in the A1 column and the C2 row, the shape in the A2 column and the D1 row, the shape in the A1 column and the D1 row, the shape in the B1 column and the C1 row, and the shape in the B2 column and the C1 row. Accordingly, in the display pattern PT2, the shape in the A2 column and the C1 row, the shape in the A1 column and the C1 row, the shape in the A2 column and the C3 row, the shape in the A1 column and the C2 row, the shape in the A2 column and the D1 row, the shape in the A1 column and the D1 row, the shape in the B1 column and the C1 row, and the shape in the B2 column and the C1 row are arrayed in this order.

The display pattern PT3, the display pattern PT4, and the display pattern PT5 are forms for displaying the shapes represented by the respective plurality of template data TD in display forms corresponding to similarity degrees to the shape of the projection region estimated by the estimating section 420. Arrays of the shapes in the display pattern PT3, the display pattern PT4 and the display pattern PT5 are the same as the array in the display pattern PT1.

More specifically, the display pattern PT4 is a form in which, among the shapes represented by the respective plurality of template data TD, display of template images, similarity degrees of which to the shape of the projection region estimated by the estimating section 420 are smaller than a predetermined threshold is omitted. This is because it is less likely that the user selects shapes indicated by the template images, the similarity degrees of which to the shape of the projection region estimated by the estimating section 420 are smaller than the predetermined threshold. For example, when the first template data TD and the second template data TD are stored in the storage device 30, in this display pattern, when a similarity degree of the shape of the first candidate indicated by the first template image is smaller than the threshold, display of the shape of the first candidate is omitted. Similarly, when a similarity degree of the shape of the second candidate indicated by the second template image is smaller than the threshold, display of the shape of the second candidate is omitted. In FIG. 4, similarity degrees of the shape in the A2 column and the D1 row, the shape in the A1 column and the D1 row, the shape in the B1 column and the C1 row, and the shape in the B2 column and the C1 row are smaller than the threshold.

The display pattern PT3 and the display pattern PT5 are forms in which the shapes represented by the respective plurality of template data TD are displayed with decorations corresponding to similarities of the shapes given to the shapes. The display pattern PT3 is a form in which shapes represented by the respective plurality of template data TD are displayed to be superimposed on backgrounds of colors corresponding to similarity degrees of the shapes. In the display pattern PT3 shown in FIG. 4, shapes, similarity degrees of which to the shape of the projection region estimated by the estimating section 420 are equal to or larger than the predetermined threshold, are superimposed on backgrounds of predetermined colors and shapes, similarity degrees of which are smaller than the threshold, are displayed alone. In FIG. 4, the predetermined colors are represented by right-downward hatching. The colors of the backgrounds of the shapes, the similarity degrees of which are equal to or larger than the predetermined threshold, may be darker as the similarity degrees are higher. With this form, shapes having high similarity degrees to the shape of the projection region estimated by the estimating section 420 can be made conspicuous.

The display pattern PT5 is a form in which, on the shapes represented by the respective plurality of template data TD, foregrounds having colors corresponding to similarity degrees of the shapes and applied with transmission processing are superimposed and displayed. In the display pattern PT5 shown in FIG. 4, shapes, similarity degrees of which to the shape of the projection region estimated by the estimating section 420 are smaller than a predetermined threshold, are displayed under the foreground of the predetermined colors and shapes, similarity degrees of which are equal to or larger than the threshold, are displayed alone. If transmittances of the foregrounds superimposed on the shapes, the similarity degrees of which are smaller than the thresholds, are set low, the shapes, the similarity degrees of which are smaller than the threshold, are less conspicuous. In FIG. 4, the colors of the foregrounds are represented by right-upward hatching. The colors of the foregrounds of the shapes, the similarity degrees of which are smaller than the predetermined threshold, may be darker as the similarity degrees are lower. With this form, shapes having low similarity degrees to the shape of the projection region estimated by the estimating section 420 can be made less conspicuous.

The setting section 460 receives operation by the user for selecting any one of a plurality of shapes that the first display control section 440 or the second display control section 450 causes the display device to display. The setting section 460 sets the shape selected by the user as the shape of the projection region. The changing section 470 causes the display device of the touch panel 10 to display an image representing the shape of the projection region set by the setting section 460 to urge the user to execute operation for changing the shape of the projection region. When the operation for changing the shape of the projection region is performed on the touch panel 10, the changing section 470 changes the shape of the projection region according to the operation by the user. Examples of the operation for changing the shape of the projection region include operation for, for example, selecting a contour line or a vertex of the projection region and moving the contour line or the vertex.

Figure 6:
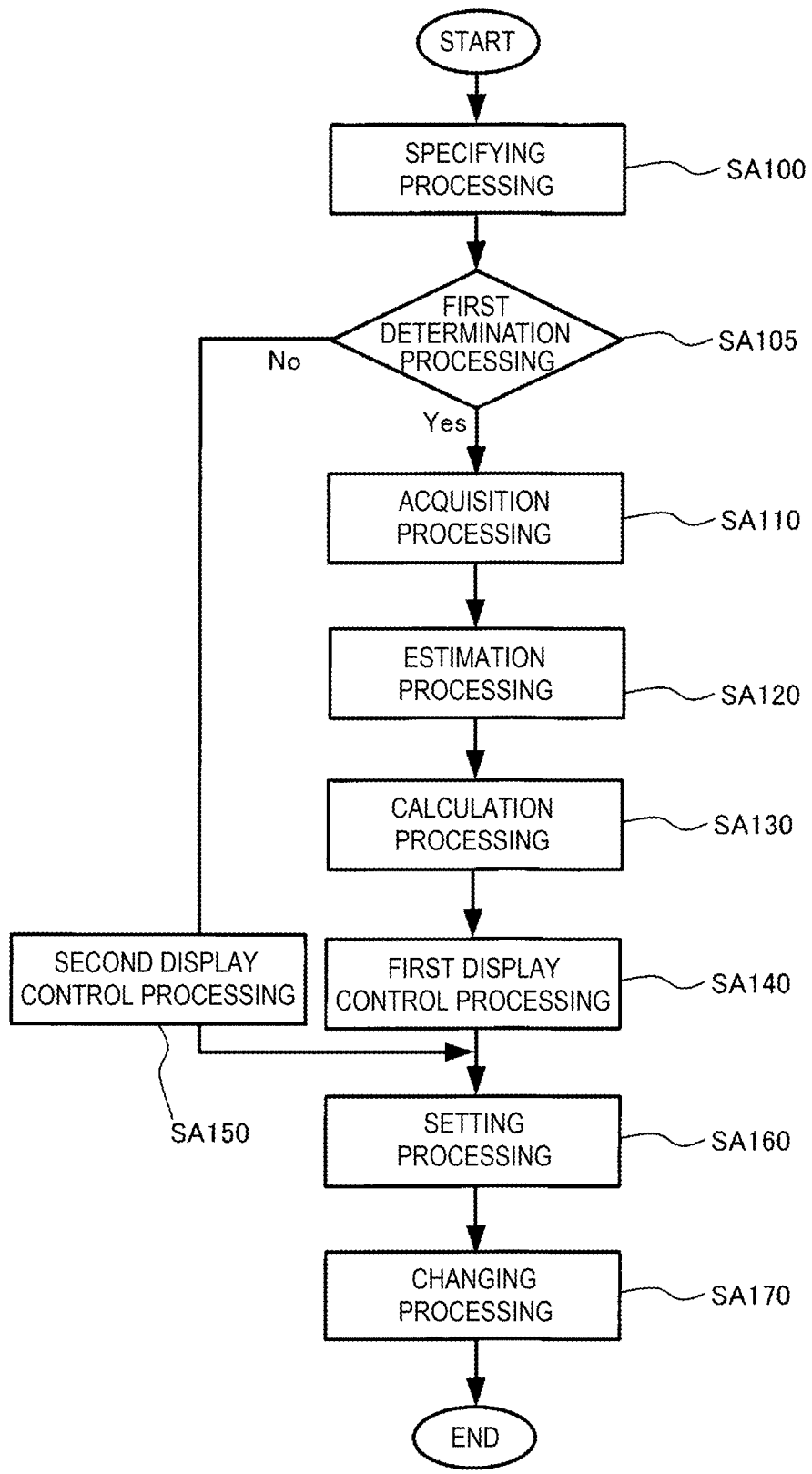
FIG. 6 is a flowchart showing a flow of the setting support method.

The processing device 40 operating according to the program PA executes a setting support method according to the present disclosure. FIG. 6 is a diagram showing a flow of the setting support method executed by the processing device 40 according to the program PA. As shown in FIG. 6, the setting support method according to the present disclosure includes specifying processing SA100, first determination processing SA105, acquisition processing SA110, estimation processing SA120, calculation processing SA130, first display control processing SA140, second display control processing SA150, setting processing SA160, and changing processing SA170.

In the specifying processing SA100, the processing device 40 functions as the specifying section 400. In the specifying processing SA100, the processing device 40 calculates, based on an image of a measurement pattern projected from the projector 2 and a captured image of the projection object SC onto which the image of the measurement pattern is projected, a transformation matrix for mutually transforming the projector coordinate system and the camera coordinate system.

In the first determination processing SA105, the processing device 40 determines whether operation for requesting setting support is performed on the input device of the touch panel 10. When a determination result of the first determination processing SA105 is "Yes", that is, affirmative, the processing device 40 executes the acquisition processing SA110. In contrast, when the determination result of the first determination processing SA105 is "No", that is, negative, the processing device 40 executes the second display control processing SA150.

In the acquisition processing SA110, the processing device 40 functions as the acquiring section 410. In the acquisition processing SA110, the processing device 40 acquires a captured image of the projection object SC. In the estimation processing SA120 following the acquisition processing SA110, the processing device 40 functions as the estimating section 420. In the estimation processing SA120, the processing device 40 estimates the shape of the projection region based on the captured image acquired in the acquisition processing SA110, the correspondence relation specified in the specifying processing SA100, the internal parameters of the imaging device 50, and the internal parameters of the projector 2. In the calculation processing SA130 following the estimation processing SA120, the processing device 40 functions as the calculating section 430. In the calculation processing SA130, the processing device 40 calculates, about the shapes represented by the respective plurality of template data TD stored in the storage device 30, similarity degrees to the shape estimated by the estimating section 420.

In the first display control processing SA140 following the calculation processing SA130, the processing device 40 functions as the first display control section 440. In the first display control processing SA140, the processing device 40 arrays the shapes represented by the respective plurality of template data TD in display order corresponding to the similarity degrees of the shapes and causes the display device of the touch panel 10 to display the shapes to urge the user to set anyone of the shapes as the shape of the projection region. In contrast, in the second display control processing SA150 executed when a determination result of the first determination processing SA105 is negative, the processing device 40 functions as the second display control section 450. In the second display control processing SA150, the processing device 40 arrays the shapes represented by the respective plurality of template data ID in predetermined order and causes the display device of the touch panel 10 to display the shapes to urge the user to set any one of the shapes as the shape of the projection region.

In the setting processing SA160, the processing device 40 functions as the setting section 460. In the setting processing SA160, the processing device 40 receives operation of the user for selecting any one of the plurality of shapes that the processing device 40 causes the display device to display in the first display control processing SA140 or the second display control processing SA150. Subsequently, the processing device 40 sets the shape selected by the user as the shape of the projection region. In the changing processing SA170, the processing device 40 functions as the changing section 470. In the changing processing SA170, the processing device 40 causes the display device of the touch panel 10 to display an image representing the shape of the projection region set in the setting processing SA160. When operation for changing the shape of the projection region is performed on the touch panel 10, the processing device 40 changes the shape of the projection region according to the operation of the user.

With the setting support device 1A in this embodiment, the shapes represented by the respective plurality of template data TD are arrayed in order corresponding to similarity degrees to the shape of the projection region estimated by the estimating section 420 and displayed. Accordingly, the user can select an appropriate shape out of the shapes represented by the respective plurality of template data TD and set the projection region referring to the display order of the plurality of shapes.

2. Modifications

The embodiment may be changed as explained below.

(1) In the embodiment, the shape of the projection region in the projection object SC is estimated based on the correspondence relation between the projector coordinate system and the camera coordinate system, the captured image of the projection object SC by the imaging device 50, and the internal parameters. However, another aspect may be adopted if the shape of the projection region in the projection object SC is estimated based on the captured image of the projection object SC by the imaging device 50. As specific examples of the other aspect, an aspect of using edge detection, an aspect of using a processor functioning as a discriminator generated by deep learning or the like, and an aspect of using feature values such as SIFT, SURF, ORB, or AKAZE are conceivable.

Edges mean pixels in which luminance suddenly changes when luminance of pixels is sampled in a horizontal scanning direction or a vertical scanning direction of an image. The luminance is usually different in pixels corresponding to the projection object SC and pixels corresponding to a background of the projection object SC in the captured image of the projection object SC. That is, contour lines of the projection object SC are usually edges in the captured image of the projection object SC. Accordingly, the contour line of the projection object SC reflected in the captured image can be detected by detecting the edges from the captured image of the projection object SC. Processing content of the aspect of using edge detection is as explained below. First, the estimating section 420 performs edge detection processing on the captured image of the projection object SC by the imaging device 50. A well-known technique only has to be used as appropriate for the edge detection processing. Subsequently, the estimating section 420 performs Hough transform on an edge detection result and calculates straight lines or curved lines corresponding to edges and intersections of the lines. The calculating section 430 applies the edge detection processing to a respective plurality of pattern images and performs Hough transform on an edge detection result to calculate straight lines or curved lines corresponding to edges and intersections of the lines. The calculating section 430 adds larger weights to shapes represented by template images in which the numbers of lines, types of the lines, and the numbers of intersections more approximate to the number of lines, a type of the lines, and the number of intersections extracted by the estimating section 420. In the aspect of using edge extraction for extraction of the shape of the projection region, it is unnecessary to perform three-dimensional measurement of the projection object SC. The specifying section 400 is unnecessary. That is, the specifying section 400 in the embodiment is not an essential constituent element of the setting support device according to the present disclosure and can be omitted.

As specific examples of the aspect of using the discriminator generated by the deep learning or the like, two aspects explained below are conceivable. A first aspect is an aspect of using a discriminator that already learned, with the deep learning or the like, a three-dimensional shape of an object and a shape of a projection region in the object in association with each other. The discriminator outputs, according to an input of information indicating the three-dimensional shape, information indicating a shape of the projection region corresponding to the three-dimensional shape. Specific examples of the information indicating the three-dimensional shape include the number of surfaces forming the three-dimensional shape, a type of the surfaces, and a type of corner portions. In the first aspect, the estimating section 420 only has to extract information indicating a three-dimensional shape of the projection object SC from a captured image of the projection object SC, input the information to the discriminator, and estimate the shape of the projection region according to output information from the discriminator. In this case, if learning is performed using, as teacher data, information concerning the shapes represented by the plurality of template data TD, reliability degrees output from the discriminator can be set as similarity degrees about the shapes. A second aspect is an aspect of using a discriminator that already learned, with the deep learning or the like, an image of an object and a shape of a projection region in the object in association with each other. The discriminator outputs, according to an input of the image of the object, information indicating a shape of the projection region corresponding to the image of the object. In the second aspect, the estimating section 420 only has to input a captured image of the projection object SC by the imaging device 50 to the discriminator and estimate the shape of the projection region in the projection object SC according to output information from the discriminator.

(2) The aspect of adding decorations corresponding to similarity degrees to the shape of the projection region estimated by the estimating section 420 may be an aspect of painting out, in colors corresponding to the respective similarity degrees, inner sides of the shapes represented by the respective plurality of template data TD. The aspect may be an aspect of displaying the shapes represented by the respective plurality of template data TD in sizes corresponding to similarity degrees to the shape of the projection region estimated by the estimating section 420. For example, it is assumed that the first similarity degree is higher than the second similarity degree. In this case, according to this aspect, the shape of the first candidate is displayed larger than the shape of the second candidate. According to this aspect, the shape of the first candidate, the similarity degree of which to the shape of the projection region estimated by the estimating section 420 is higher than the similarity degree of the second candidate, is displayed larger than the shape of the second candidate. Therefore, the shape of the first candidate can be made more conspicuous than the shape of the second candidate. In other words, the shape of the second candidate is less conspicuous than the shape of the first candidate.

(3) The second display control section 450 in the embodiment explained above may be omitted. The first determination processing SA105 and the second display control processing SA150 may be omitted from the setting support method shown in FIG. 6. The setting section 460 and the changing section 470 may be omitted. The setting processing SA160 and the changing processing SA170 may be omitted from the setting support method shown in FIG. 6. This is because, if at least the first display control processing SA140 is executed, it is possible to urge the user to select an appropriate shape from the shapes represented by the respective plurality of template data TD. The acquiring section 410, the estimating section 420, the calculating section 430, and the first display control section 440 in the embodiment explained above are the software modules. However, a part or all of the acquiring section 410, the estimating section 420, the calculating section 430, and the first display control section 440 may be hardware. Examples of the hardware include a DSP (Digital Signal Processor), an ASIC (Application Specific Integrated Circuit), a PLD (Programmable Logic Device), and an FPGA (Field Programmable Gate Array). Even if a part or all of the acquiring section 410, the estimating section 420, the calculating section 430, and the first display control section 440 are hardware, the same effects as the effects in the embodiment are achieved.

(4) The setting support device 1A is the smartphone including the imaging device 50. However, the setting support device 1A may be a tablet terminal including an imaging device or a notebook or stationary personal computer including an imaging device. When the notebook or stationary personal computer is used as the setting support device according to the present disclosure, various kinds of operation may be received using a mouse or a keyboard as an input device. When the setting support device can acquire a captured image by data communication through a network such as a LAN, the setting support device does not need to include the imaging device. In a computer system including a server device that communicates with a portable terminal such as a smartphone or a tablet terminal via a LAN or the Internet, a processing device of the server device may be caused to function as the acquiring section 410, the estimating section 420, the calculating section 430, and the first display control section 440 and the portable terminal may be caused to play a role of the input device. The computer system is an example of the setting support system according to the present disclosure.

(5) In the embodiment explained above, the program PA is stored in the storage device 30. However, the program PA may be manufactured or distributed alone. As a specific distribution method for the program PA, an aspect of writing the program PA in a computer-readable recording medium such as a flash ROM (Read Only Memory) and distributing the program PA or an aspect of distributing the program PA by downloading the program PA through an electric communication line such as the Internet is conceivable. By installing the program PA in a general information processing device such as a personal computer and causing a computer such as a CPU of the information processing device to operate according to the program PA, it is possible to cause the information processing device to function as the setting support device according to the present disclosure.

3. Aspects Grasped from at Least One of the Embodiment and the Modifications

The present disclosure is not limited to the embodiment and the modifications explained above and can be realized in various aspects without departing from the gist of the present disclosure. For example, the present disclosure can also be realized by aspects described below. Technical features in the embodiment corresponding to technical features in the aspects described below can be substituted or combined as appropriate in order to solve apart or all of the problems of the present disclosure or attain a part or all of the effects of the present disclosure. Unless the technical features are explained in this specification as essential technical features, the technical features can be deleted as appropriate.

In order to solve the problems described above, an aspect of the setting support method for the projection region according to the present disclosure includes the acquisition processing SA110, the estimation processing SA120, the calculation processing SA130, and the first display control processing SA140. In the acquisition processing SA110, a first image obtained by imaging, with an imaging device, a projection object onto which a projection image is projected from a projector is acquired. In the estimation processing SA120, a shape of a projection region, which is a projection destination of the projection image in the projection object, is estimated based on the first image. In the calculation processing SA130, similarity degrees to the shape estimated based on the first image are calculated about a first template image showing a first candidate of the shape of the projection region and a second template image showing a shape of a second candidate different from the first candidate. In the first display control processing SA140, in order to urge the user to set one of the first candidate and the second candidate as the shape of the projection region, the first template image and the second template image are displayed in display order or display forms corresponding to the similarity degrees of the first template image and the second template image. With the setting support method according to this aspect, the user can set an appropriate one of the first candidate and the second candidate as the shape of the projection region referring to the display order or the display forms of the first candidate and the second candidate.

In the estimation processing SA120 in a setting support method according to a more preferred aspect, edge extraction may be applied to the first image and a shape of the projection region may be estimated based on an edge extraction result. In the estimation processing SA120 in a setting support method according to another preferred aspect, a three-dimensional shape of the projection object may be estimated based on a correspondence relation between a first coordinate system representing a position in the projection image and a second coordinate system representing a position in the first image and the first image. The shape of the projection region may be estimated based on an estimation result of the three-dimensional shape of the projection object.

In the estimation processing SA120 in a setting support method according to still another preferred aspect, the shape of the projection region may be estimated using a discriminator that already learned a three-dimensional shape of an object and a shape of a projection region in the object in association with each other and outputs, according to an input of information indicating the three-dimensional shape, information indicating the shape of the projection region corresponding to the three-dimensional shape. More specifically, in the estimation processing SA120, information indicating a three-dimensional shape estimated about the projection object is input to the discriminator. A shape of the projection region in the projection object is estimated according to output information from the discriminator. In the estimation processing SA120 in a setting support method according to still another preferred aspect, the shape of the projection region may be estimated using a discriminator that already learned an image of an object and a shape of a projection region in the object in association with each other and outputs, according to an input of the image of the object, information indicating the shape of the projection region corresponding to the image of the object. More specifically, in the estimation processing SA120, the first image is input to the discriminator and a shape of the projection region in the projection object is estimated according to output information from the discriminator.

A setting support method according to another preferred aspect may include the setting processing SA160 explained below. The setting processing SA160 is a processing for receiving operation of the user for selecting one of the shape of the first candidate and the shape of the second candidate and setting the shape selected by the user as the shape of the projection region. A setting support method according to still another preferred aspect may include the changing processing SA170 explained below. In the changing processing SA170, the shape selected by the user is displayed to urge the user to perform operation for changing the shape of the projection region. In the changing processing SA170, the shape of the projection region set by the user is changed according to operation by the user.

In the first display control method SA140 in a setting support method according to another preferred aspect, the shape of the first candidate and the shape of the second candidate may be arrayed and displayed in order corresponding to the similarity degrees of the shapes. According to this aspect, it is possible to grasp degrees of similarities of the candidates through the display order of the candidates.

In the first display control processing SA140 in a setting support method according to another preferred aspect, one shape having a higher similarity degree of the shape of the first candidate and the shape of the second candidate may be displayed larger than the other. According to this aspect, it is possible to grasp degrees of similarity of the candidates through sizes of the shapes of the candidates. According to the aspect, since the shape having the higher similarity degree is displayed larger than the other shape, it is possible to make the shape having the higher similarity degree more conspicuous than the other shape. In other words, since the shape having the lower similarity degree is displayed smaller than the other shape, the shape having the lower similarity degree is less conspicuous than the other shape.

In the first display control processing SA140 in a setting support method according to another preferred aspect, the shape of the first candidate and the shape of the second candidate may be displayed with decorrelations corresponding to the similarity degrees of the shapes added to the shapes. Examples of a specific aspect of the decorations corresponding to the similarity degrees include an aspect of painting out the shape of the first candidate and the shape of the second candidate with colors corresponding to the similarity degrees of the shapes. According to this aspect, it is possible to grasp degrees of similarity of the candidates through the colors painting out the shapes of the candidates. Other specific examples of the decorations corresponding to the similarity degrees include an aspect of superimposing the shape of the first candidate and the shape of the second candidate on backgrounds or foregrounds of colors corresponding to the similarity degrees of the shapes and displaying the shapes. According to this aspect, it is possible to grasp degrees of similarity of the candidates through the colors of the backgrounds or the foregrounds of the shapes of the candidates.

In the first display control processing SA140 in a setting support method according to another preferred aspect, the shape of the first candidate may not be displayed when the similarity degree of the shape of the first candidate is smaller than a threshold and the shape of the second candidate may not be displayed when the similarity degree of the shape of the second candidate is smaller than the threshold. Since the shape having the similarity degree smaller than the threshold is not displayed as a candidate of the projection region in the setting method according to this aspect, the setting support method is suitable for a terminal device having a narrow display region like a portable terminal.

In order to solve the problems explained above, a setting support system for a projection region according to the present disclosure includes the imaging device 50, the display device, and the processing device 40. The processing device 40 executes the acquisition processing SA110, the estimation processing SA120, the calculation processing SA130, and the first display control processing SA140. With the setting support system according to this aspect as well, the user can set, as the shape of the projection region, appropriate one of the first candidate and the second candidate referring to display order or display forms of the first candidate and the second candidate.

In order to solve the problems explained above, a program according to the present disclosure causes a computer to execute the acquisition processing SA110, the estimation processing SA120, the calculation processing SA130, and the first display control processing SA140. With the program according to this aspect as well, the user can set, as the shape of the projection region, appropriate one of the first candidate and the second candidate referring to display order or display forms of the first candidate and the second candidate.

What is claimed is:

1. A setting support method for a projection region comprising:
    acquiring a first image obtained by imaging, with a camera, a projection object onto which a projection image is projected from a projector;

estimating, based on the first image, a shape of a projection region, which is a projection destination of the projection image in the projection object;

calculating a first similarity degree indicating a degree of similarity of a first template image showing a first candidate of the shape of the projection region and the shape estimated based on the first image;

calculating a second similarity degree indicating a degree of similarity of a second template image showing a shape of a second candidate different from the first candidate and the shape estimated based on the first image;

displaying the first template image and the second template image in descending order or display forms corresponding to the first similarity degree and the second similarity degree;

displaying the first template image superimposed on a background having a color corresponding to the first similarity degree; and displaying the second template image superimposed on a background having a color corresponding the second similarity degree.

2. The setting support method for the projection region according to claim 1, further comprising applying edge extraction to the first image and estimating the shape of the projection region based on an edge extraction result.

3. The setting support method for the projection region according to claim 1, further comprising:

estimating a three-dimensional shape of the projection object based on the first image and a correspondence relation between a first coordinate system representing a position in the projection image and a second coordinate system representing a position in the first image; and estimating the shape of the projection region based on an estimation result of the three-dimensional shape of the projection object.

4. The setting support method for the projection region according to claim 3, further comprising:

inputting information indicating the three-dimensional shape estimated about the projection object to a processor functioning as a discriminator that already learned a three-dimensional shape of an object and a shape of a projection region in the object in association with each other, and the discriminator outputs, according to an input of information indicating the three-dimensional shape, information indicating a shape of the projection region corresponding to the three-dimensional shape; and estimating the shape of the projection region in the projection object according to output information from the discriminator.

5. The setting support method for the projection region according to claim 1, further comprising:

inputting the first image to a processor functioning as a discriminator that already learned an image of an object and a shape of a projection region in the object in association with each other, and the discriminator outputs, according to an input of the image of the object, information indicating a shape of the projection region corresponding to the image of the object; and estimating the shape of the projection region in the projection object according to output information from the discriminator.

6. The setting support method for the projection region according to claim 1, further comprising:

receiving operation by a user for selecting one of the shape of the first candidate and the shape of the second candidate; and setting, as the shape of the projection region, the shape selected by the user.

7. The setting support method for the projection region according to claim 6, further comprising:

displaying the shape selected by the user; and changing, according to operation for changing the shape of the projection region by the user, the shape of the projection region set by the user.

8. The setting support method for the projection region according to claim 1, further comprising displaying the shape of the first candidate and the shape of the second candidate arrayed in order corresponding to the first similarity degree and the second similarity degree.

9. The setting support method for the projection region according to claim 1, further comprising displaying one shape, having a higher similarity degree of the shape of the first candidate and the shape of the second candidate, larger than another.

10. The setting support method for the projection region according to claim 1, further comprising:

displaying the shape of the first candidate with decoration corresponding to the first similarity degree; and displaying the shape of the second candidate added decoration corresponding to the second similarity degree.

11. The setting support method for the projection region according to claim 10, further comprising:

displaying the shape of the first candidate painted out in a color corresponding to the first similarity degree; and displaying the shape of the second candidate painted out in a color corresponding to the second similarity degree.

12. The setting support method for the projection region according to claim 10, further comprising:

displaying the shape of the first candidate superimposed on a background of a color corresponding to the first similarity degree or superimposed foregrounds of the colors corresponding to the first similarity degree; and displaying the shape of the second candidate superimposed on a background of a color corresponding to the second similarity degree or superimposed foregrounds of the colors corresponding to the second similarity degree.

13. The setting support method for the projection region according to claim 1, further comprising:

not displaying the shape of the first candidate when the similarity degree of the shape of the first candidate is smaller than a threshold; and not displaying the shape of the second candidate when the similarity degree of the shape of the second candidate is smaller than the threshold.

14. A setting support system for a projection region comprising:

a camera;

a display device; and at least one processor executes:

acquiring a first image obtained by imaging, with the camera, a projection object onto which a projection image is projected from a projector;

estimating, based on the first image, a shape of a projection region, which is a projection destination of the projection image in the projection object;

calculating a first similarity degree indicating a degree of similarity of a first template image showing a first candidate of the shape of the projection region and the shape estimated based on the first image;

calculating a second similarity degree indicating a degree of similarity of a second template image showing a shape of a second candidate different from the first candidate and the shape estimated based on the first image;

displaying, by the display device, the first template image and the second template image in descending order or display forms corresponding to the first similarity degree and the second similarity degree;

displaying the first template image superimposed on a background having a color corresponding to the first similarity degree; and displaying the second template image superimposed on a background having a color corresponding the second similarity degree.

15. A non-transitory computer-readable storage medium storing a program, the program causing a computer to execute:

acquiring a first image obtained by imaging, with a camera, a projection object onto which a projection image is projected from a projector;

estimating, based on the first image, a shape of a projection region, which is a projection destination of the projection image in the projection object;

calculating a first similarity degree indicating a degree of similarity of a first template image showing a first candidate of the shape of the projection region and the shape estimated based on the first image;

calculating a second similarity degree indicating a degree of similarity of a second template image showing a shape of a second candidate different from the first candidate and the shape estimated based on the first image;

displaying the first template image and the second template image in descending order or display forms corresponding to the first similarity degree and the second similarity degree;

displaying the first template image superimposed on a background having a color corresponding to the first similarity degree; and displaying the second template image superimposed on a background having a color corresponding the second similarity degree.

* * * * *